N. M. BAKER.
EYEGLASSES.
APPLICATION FILED OCT. 16, 1911.
1,081,713.
Patented Dec. 16, 1913.
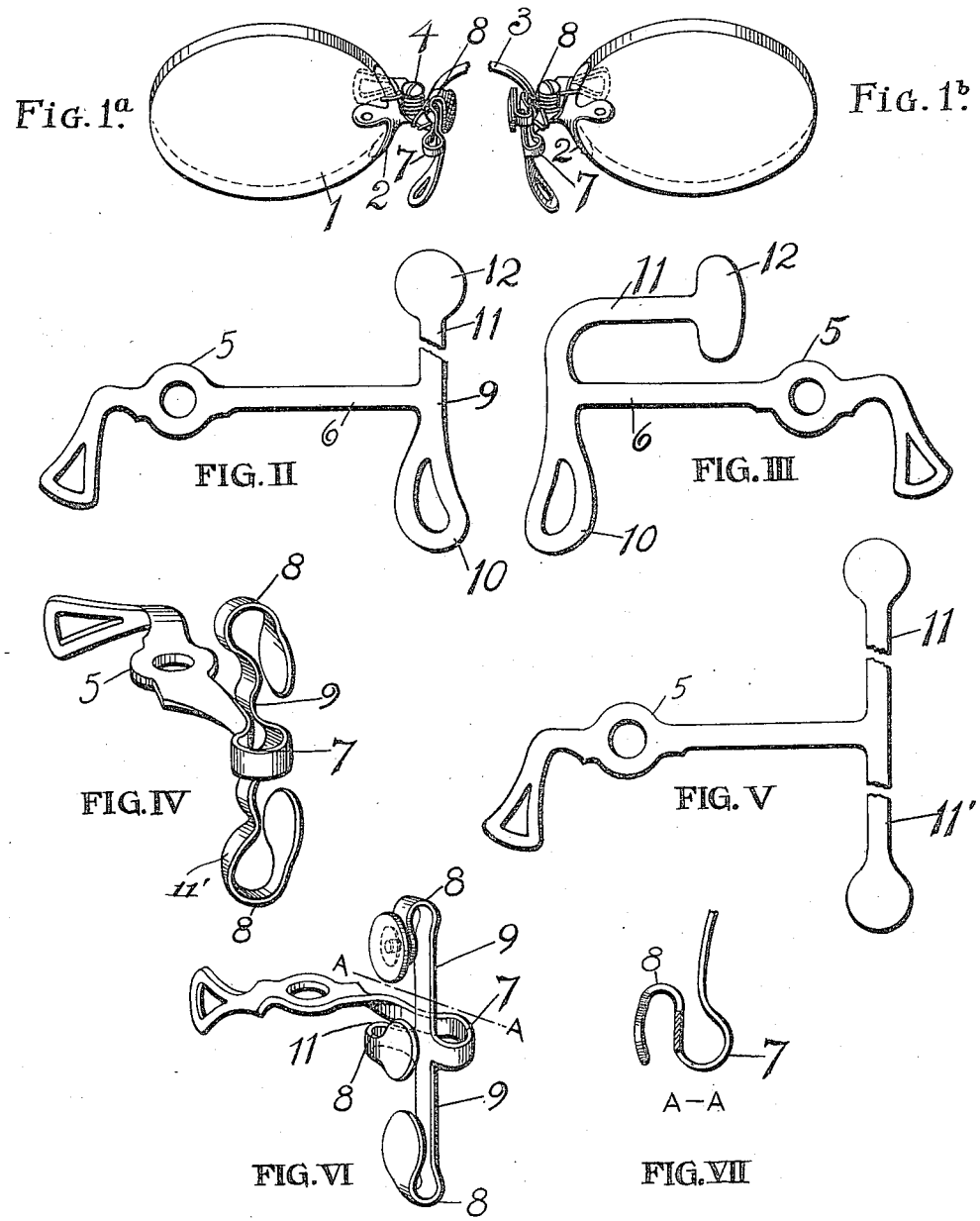
WITNESSES:
Joseph J. Demers
Reginald H. Waters.
INVENTOR
NELSON M. BAKER
H. H. Styll
ATTORNEYS

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

EYEGLASSES.

1,081,713.  Specification of Letters Patent.  Patented Dec. 16, 1913.

Application filed October 16, 1911. Serial No. 654,913.

*To all whom it may concern:*

Be it known that I, NELSON M. BAKER, a citizen of the United States, residing at Southbridge, in the county of Worcester and State of Massachusetts, have invented certain new and useful Improvements in Eyeglasses, of which the following is a specification.

My invention relates to improvements in eyeglasses, and has particular reference to an improved form of adjustable nose clip.

The leading object of my invention is the provision of an improved nose clip having a plurality of bearing points, which nose clip shall be so constructed and supported that the clip may be adjusted as an entirety, or the position of the various bearing points may be adjusted individually relatively to each other according to the particular configuration of the nose to be engaged by said bearing points of my clip.

The further object of my invention is the provision of an adjustable nose clip having a plurality of bearing portions having free front edges and which bearing portions may be individually or collectively adjusted to vary both the point at which they bear against the nose and also to vary the biting of the free front edge against the nose.

Other objects and advantages of my improved adjustable nose clip for eyeglasses will be readily apparent by reference to the following description taken in connection with the accompanying drawings, and it will be understood that I may make any modifications in the specific structure shown and described within the scope of the appended claim without departing from or exceeding the spirit of my invention.

Figure I^A represents a rear view slightly in perspective of one side of an eyeglass mounting illustrating one type of my guard. Fig. I^B represents a similar view of the other side of the mounting illustrating a slightly different form of guard. Fig. II represents a plan view of the blank from which the fingerpiece and nose clip shown in Fig. I^A is formed. Fig. III represents a similar view of the blank for forming the right hand fingerpiece and nose clip. Fig. IV represents a perspective view of another modification of my invention. Fig. V represents a plan view of the blank for forming said device shown in Fig. IV. Fig. VI represents a perspective view of a still further modification of my invention showing a three point bearing clip, and Fig. VII represents a sectional view on the line A—A of Fig. VI.

In the drawings, in which similar characters of reference are employed to denote corresponding parts throughout the several views, the numeral 1 designates the eyeglass lenses having secured thereto the usual lens clips 2 connected by the bridge 3 forming the lens mounting from which rise the pivot screws 4 on which are rotatably mounted the finger piece levers 5. Said fingerpiece levers 5 have the rearwardly extending pliable arm portions 6 which are formed at 7 into bends adjacent the rear edge of the nose clips proper. These bends 7 as well as the bends 8 to be later described, serve a double purpose in my improved clip, in that they both provide a pliable portion which may be readily bent or twisted to facilitate exact adjustment of the clip or bearing portion carried thereby and also by their attachment at but one edge of the said bearing portion, which edge in all instances is other than the front edge of said bearing portion serving to provide what is known as a free front edge. This free front edge possesses a pronounced and decided advantage, particularly when the clips are formed from a thin material or a material having a flat as counterdistinguished from a rounded front edge, in that this free front edge will bite into or firmly engage the flesh covering the bridge of the nose and forward creeping movement of the glasses will merely tend to cause said edge to more firmly engage the flesh to supplement the clinging effect of the bearing portion proper and aid in retaining the glasses in place.

By a comparison of the various forms of my invention as illustrated in the accompanying drawings, it will be seen that all of these forms embody the same generic idea and differ but slightly in their construction. In each instance I have shown formed on the end of the pliable portion 6 the central or body portion 9 of the nose clip. In Fig. II I have shown said clip as having at its lower end the bearing pad or portion 10 and having the upwardly extending pliable arm 11 terminating in a second bearing pad or portion 12. In Fig. III the parts are identical with the exception that the arm 11 instead of being straight in form is stamped out in L shape, whereby the completed article has the loop connected to the rear of the upper nose engaging pad 12 instead of to the top of said pad as shown in Fig. I^A. In the manufacture of both of these clips, however, I bend the pliable arm 11 adjacent the bearing pad or portion into the loop 8 whose purpose has been previously described.

In the modification shown in Figs. IV and V instead of employing the large bearing pad or portion 10 at the lower end of the clip I have lengthened the main portion 9 of the clip in the pliable arm 11' bent into the lower loop 8 to provide the pair of independently adjustable bearing pads or portions 12 at the upper and lower ends of the clip.

Fig. VI illustrates a development of the form of invention shown in Fig. IV, the only difference being that the central portion 9 of the clip in this instance is provided with a third pliable arm 11" which is bent into the loop 8 and terminates in the middle bearing pad or portion 12, this form providing a three point bearing clip.

In fitting glasses equipped with my improved nose engaging clip it is merely necessary for the optician to place the same on the nose of a person and then by observing the fit of the clip against the nose he can decide on the necessary adjustment and then by grasping either the loop 7 or the loop 8 with his pliers may bend the loop and adjust the clip. If the angle of the entire clip requires adjustment this will be attained by a bending of the loop 7, but if the lower bearing point is satisfactory and the upper does not seem to be satisfactory either as to the biting engagement of the free front edge or the direct bearing thereof this may be altered by bending of the loop 8.

The particular advantage of the loop 7 in those forms of the invention illustrated in Figs. I^A I^B, IV and VI is that by employing this loop after the bearing pads or portions 12 have been exactly fitted against the nose by adjustment at the bends 8, a slight opening of the loop 7 will then serve to regulate and increase the biting of the free front edge of the bearing portions without liability of derangement of their normal bearing adjustment.

From the foregoing description taken in connection with the accompanying drawings the construction and use of a nose clip constructed in accordance with the general principles of my invention will be readily understood, and it will be seen that I have provided an improved nose clip in which the clip may be adjusted as an entirety or in which the individual bearing points of the clip may be readily adjusted individually with respect to each other and which clip will consequently commend itself to all on account of its desirability in point of easy adjustment and also on account of the efficiency with which it will grip a nose.

I claim:—

The combination with a nose clip arm having a terminal adjustment loop, of a nose clip at the end of said loop, said clip having a reduced portion looped transversely of the material thereof and terminating in a bearing pad.

In testimony whereof I affix my signature in presence of two witnesses.

NELSON M. BAKER.

Witnesses:
 JOSEPH J. DEMERS,
 REGINALD H. WATERS.